(12) United States Patent
Werner et al.

(10) Patent No.: US 11,349,269 B2
(45) Date of Patent: May 31, 2022

(54) WIRELESS ADAPTER AND HANDHELD ELECTRONIC DEVICE TO WIRELESSLY CONTROL THE WIRELESS ADAPTER

(71) Applicants: Aaron Werner, Hurricane, UT (US); Andrew Evans, Hurricane, UT (US)

(72) Inventors: Aaron Werner, Hurricane, UT (US); Andrew Evans, Hurricane, UT (US)

(*) Notice: Subject to any disclaimer, the term of this patent is extended or adjusted under 35 U.S.C. 154(b) by 0 days.

(21) Appl. No.: 17/379,826

(22) Filed: Jul. 19, 2021

(65) Prior Publication Data

US 2021/0408745 A1 Dec. 30, 2021

Related U.S. Application Data

(63) Continuation-in-part of application No. 17/306,487, filed on May 3, 2021.

(60) Provisional application No. 63/044,324, filed on Jun. 25, 2020.

(51) Int. Cl.
*H01R 33/90* (2006.01)
*H01R 13/66* (2006.01)
*G06J 1/00* (2006.01)
*H01R 12/71* (2011.01)
*H01R 12/70* (2011.01)

(52) U.S. Cl.
CPC .......... *H01R 33/90* (2013.01); *G06J 1/00* (2013.01); *H01R 12/716* (2013.01); *H01R 13/6691* (2013.01); *H01R 12/7011* (2013.01); *H01R 2201/04* (2013.01)

(58) Field of Classification Search
CPC .......... H01R 33/90; H01R 13/6691; H01R 12/7011; H01R 2201/04; H01R 12/716; G06J 1/00; H05K 11/00
See application file for complete search history.

(56) References Cited

U.S. PATENT DOCUMENTS

| | | |
|---|---|---|
| 4,991,810 A | 2/1991 | Andrus et al. |
| 5,114,120 A | 5/1992 | Bartelt et al. |
| 5,147,106 A | 9/1992 | Bartelt et al. |
| 5,230,405 A | 7/1993 | Bartelt |
| 5,810,547 A | 9/1998 | Bruno et al. |
| 5,967,265 A | 10/1999 | Bruno et al. |
| 7,140,475 B1 | 11/2006 | Appelqvist |
| 7,551,995 B2 | 6/2009 | Heigl et al. |
| 7,798,761 B2 | 9/2010 | Goodrich et al. |
| 7,816,878 B2 | 10/2010 | Heigl et al. |

(Continued)

*Primary Examiner* — Travis S Chambers
(74) *Attorney, Agent, or Firm* — Lowenstein Sandler LLP

(57) ABSTRACT

An adapter device includes a printed circuit board (PCB), an output port disposed on the PCB and having first pins, where the output port is to be connected to an output harness that is connected to an adaptive device. The adapter also includes wireless circuitry one of disposed on or coupled to the PCB and a processing device disposed on the PCB and coupled to the output port and wireless circuitry. The processing device is to: identify, via the wireless circuitry, an actuation command from a wireless signal received from a handheld electronic device; translate the actuation command to one or more actuation bits that match one of analog-converted bits receivable over an input harness or digital control bits receivable over a wireless controller associated with the adaptive device; and provide the actuation bits to the first pins, the actuation bits causing the adaptive device to perform a specific action.

10 Claims, 15 Drawing Sheets

(56) References Cited

U.S. PATENT DOCUMENTS

| | | |
|---|---|---|
| 7,908,695 B2 | 3/2011 | Budd et al. |
| 7,960,853 B2 | 6/2011 | Edwards et al. |
| 8,029,062 B2 | 10/2011 | Appelqvist et al. |
| 8,156,595 B2 | 4/2012 | Budd et al. |
| D668,422 S | 10/2012 | Uttech et al. |
| 8,403,615 B1 | 3/2013 | McGlinn et al. |
| 8,800,582 B2 | 8/2014 | Hooper et al. |
| 8,926,253 B2 | 1/2015 | Uttech et al. |
| 8,936,295 B2 | 1/2015 | Slungare et al. |
| 9,193,233 B2 | 11/2015 | Schwarz et al. |
| 9,227,511 B1 | 1/2016 | Dosenbach et al. |
| 9,415,703 B2 | 8/2016 | Slungare et al. |
| 9,505,594 B2 | 11/2016 | Uttech et al. |
| 9,597,240 B2 | 3/2017 | Hermanson et al. |
| 9,605,465 B2 | 3/2017 | Wojdyla et al. |
| 9,605,466 B2 | 3/2017 | Wojdyla et al. |
| 9,605,469 B2 | 3/2017 | Henseleit et al. |
| D797,396 S | 9/2017 | Bettcher, III et al. |
| D799,776 S | 10/2017 | Bettcher, III et al. |
| D801,619 S | 10/2017 | Bettcher, III et al. |
| 9,789,922 B2 | 10/2017 | Dosenbach et al. |
| D804,767 S | 12/2017 | Wojdyla |
| 9,844,987 B2 | 12/2017 | Schwarz et al. |
| D827,586 S | 9/2018 | Bettcher, III et al. |
| D827,973 S | 9/2018 | Stoner |
| 10,195,977 B2 | 2/2019 | Bettcher, III et al. |
| 10,272,003 B2 | 4/2019 | Zindler |
| 10,426,673 B2 | 10/2019 | Budd, II et al. |
| 10,470,950 B2 | 11/2019 | Kiser et al. |
| 10,485,717 B2 | 11/2019 | Moss |
| 10,532,671 B2 | 1/2020 | Laird et al. |
| 10,532,776 B2 | 1/2020 | Zindler |
| 10,562,722 B2 | 2/2020 | Pugh et al. |
| 10,576,798 B2 | 3/2020 | Schwarz et al. |
| 2016/0296391 A1* | 10/2016 | Soklaski ............... B60P 1/4421 |
| 2019/0173240 A1* | 6/2019 | Nakamura ......... H01R 13/6691 |

* cited by examiner

1000

```
┌─────────────────────────────────────────────────────┐
│ Display a user interface on the touch-sensitive     │
│ display, wherein the user interface includes a set  │
│ of menu items associated with a plurality of        │
│ adaptive devices.                                   │
│ 1010                                                │
└─────────────────────────────────────────────────────┘
                          ↓
┌─────────────────────────────────────────────────────┐
│ Detect a first contact on the touch-sensitive       │
│ display associated with a first menu item of the    │
│ set of menu items, the first menu item for          │
│ selection of control of a first adaptive device of  │
│ the plurality of adaptive devices.                  │
│ 1020                                                │
└─────────────────────────────────────────────────────┘
                          ↓
┌─────────────────────────────────────────────────────┐
│ In response to detecting the first contact, display │
│ a set of control indicia associated with control    │
│ functionality of the first adaptive device.         │
│ 1030                                                │
└─────────────────────────────────────────────────────┘
                          ↓
┌─────────────────────────────────────────────────────┐
│ Detect a second contact on the touch-sensitive      │
│ display associated with a first control indicia of  │
│ the set of control indicia.                         │
│ 1040                                                │
└─────────────────────────────────────────────────────┘
                          ↓
┌─────────────────────────────────────────────────────┐
│ Generate an actuation command associated with the   │
│ first control indicia, the actuation command        │
│ corresponding to a specific action of the adaptive  │
│ device.                                             │
│ 1050                                                │
└─────────────────────────────────────────────────────┘
                          ↓
┌─────────────────────────────────────────────────────┐
│ Transmit, via wireless circuitry, the actuation     │
│ command to a wireless adapter device to which is    │
│ coupled the adaptive device.                        │
│ 1060                                                │
└─────────────────────────────────────────────────────┘
```

FIG. 10

WIRELESS ADAPTER AND HANDHELD ELECTRONIC DEVICE TO WIRELESSLY CONTROL THE WIRELESS ADAPTER

RELATED APPLICATION

This application is a continuation-in-part of U.S. patent application Ser. No. 17/306,487, filed May 3, 2021, which claims the benefit of priority to U.S. Provisional Patent Application No. 63/044,324, filed Jun. 25, 2020, both of which are incorporated herein by these references in their entireties.

BACKGROUND

Remote controls are used for controlling televisions and other electronic devices such as garage door openers, door closers, lights, fans, window shades, and fireplaces. However, no wireless remote controls are known to be available for a combination of wheelchair lifts, cranes, workout equipment, and other such adaptive devices employed by individuals with disabilities to help them be more mobile and functional in their daily lives.

These adaptive devices instead rely on conventional wired remotes controls. Traditional wired remote controls have many limitations. These wired remotes are designed to work only for the device to which the wired remote is connected, e.g., due to unique analog signals sent over bulky harness cables. Over time, the wired remotes can wear-out, break, or become unserviceable. No solutions currently provide wireless controls of a vehicular wheelchair lift, crane, or other adaptive devices combined. Any known wireless controller for an adaptive devices fails to meet industry needs because such wireless controllers are designed for a particular model and cannot be used on any other model or adaptive device. These wireless remotes are thus merely a simple wireless version of the old wired remote for such devices.

Because of the variety of devices that use remote controls, universal remote controls have been developed in conventional electronics. For example, a universal remote control can be programmed to control more than one device, such as a television, disc player, and receiver. These devices, however, do not translate into the world of adaptive devices that have a broad array of technology used, and thus no standard, for harness communications or remote control connections that could make a universal remote possible for use on multiple adaptive devices.

BRIEF DESCRIPTION OF THE DRAWINGS

Various exemplary implementations of the present disclosure will be understood more fully from the detailed description given below and from the accompanying drawings of various exemplary implementations of the disclosure.

FIG. 10 is a flow chart of a method for selecting and controlling an adaptive device of multiple adaptive devices from a handheld electronic device, according to various embodiments.

DETAILED DESCRIPTION

Figure 1:
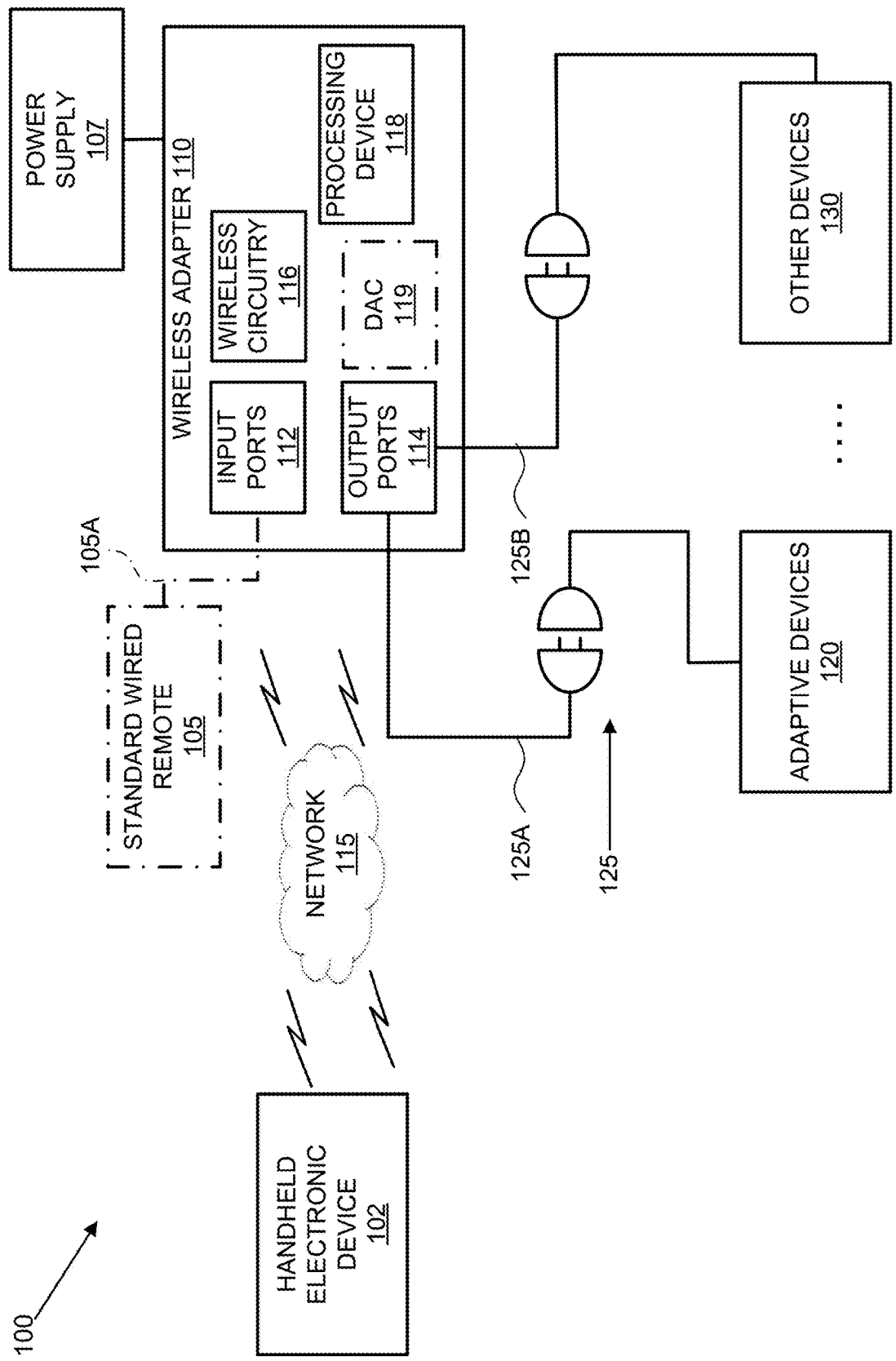
FIG. 1 is a block diagram of a remote control system including a wireless adapter and a handheld electronic device that can function as a wireless remote controller according to at least one embodiment.

Aspects of the present disclosure address the above and other deficiencies through a wireless adapter (also referred to as a wireless adapter device or apparatus) and a corresponding handheld electronic device specially adapted to function as a wireless remote controller for the wireless adapter. In various embodiments, a number of adaptive devices can be electronically coupled with the wireless adapter, such as through a harness for each adaptive device. The handheld electronic device can then be wirelessly coupled with the wireless adapter in way that the handheld electronic device can wirelessly control each of the adaptive devices despite that normally, each adaptive device could only be controlled be its own separate wired or wireless controller. These adaptive devices can include, but not be limited to, wheelchair cranes, lifts (for individuals or wheelchairs), wheelchair elevator, transfer seats, automated doors, truck bed toppers, gate openers, physical therapy equipment such as exercise machines for those with spinal (or similar immobilizing) injuries, and the like. The handheld electronic device can be any number of handheld devices such as smart phones, mini-computers, tablets or other mobile device, media players, intelligent headsets, or adaptive screens that are connected to and receive data from body-attached computing devices for the disabled.

In at least one embodiment, an adapter device (e.g., wireless adapter) includes a printed circuit board (PCB). An output port can be disposed on the PCB that includes a set of first pins, where the output port is to be connected to an output harness that is connected to an adaptive device. Wireless circuitry is one of disposed on or coupled to the PCB and a processing device is disposed on the PCB and coupled to the output port and the wireless circuitry. As used herein, the term "coupled to" can be understood to mean connected directly to or connected indirectly through one or more intervening components. The processing device can identify, via the wireless circuitry, an actuation command from a wireless signal received from a handheld electronic device, such as the handheld electronic device discussed herein. The processing device can further translate the actuation command to one or more actuation bits that match one of analog-converted bits receivable over an input harness or digital control bits receivable over a wireless controller associated with the adaptive device. The processing device can further provide the actuation bits to one or more of the set of first pins, the actuation bits to cause the adaptive device to perform a specific action. Upon receipt of the actuation bits, the adaptive device can perform the specific action and continue to respond to additional actuation bits received from the adapter device.

In this way, the actuation bits match what the adaptive device is accustomed to receiving as control bits and no additional hardware is required except to ensure the harness between the adapter device and the adaptive device has the correct connectors with the correct pin-outs, which will be discussed in more detail. Thus, some adaptation of such a harness may be required or a new custom harness can be designed to work with the adapter device and each different adaptive device that may have different connectors on the original harness for the adaptive device. In some embodiments, the adapter device can receive many different kinds of actuation signals and translate these actuation signals into additional, but different, actuation bits for controlling multiple adaptive devices that are connected to multiple output ports.

In some embodiments, the handheld electronic device can automatically communicate with the wireless adapter and a user when the user comes within a threshold distance of the wireless adapter with the handheld electronic device. For example, the wireless circuitry can be adapted for use with personal area network (PAN) technology that can detect coming into range of the wireless adapter and, in response to coming into range, prompt the user (e.g., via audio and/or video) through a user interface of the handheld electronic device asking whether the user would like the adaptive device prepared. In response to a positive reply, the handheld electronic device can automatically send the actuation bits, thus facilitating preparation of the adaptive device knowing the user is within range and likely to need the adaptive device or other adaptive equipment.

In at least one embodiment, a handheld electronic device includes a processing device, memory, and wireless circuitry coupled to the processing device. A touch-sensitive display is coupled to the processing device. One or more programs can be stored in the memory and configured to be executed by the processing device, where the one or more programs include instructions for performing a number of operations, including displaying a user interface, on the touch-sensitive display, that includes a set of menu items associated with a set of adaptive devices. The operations further include detecting a first contact on the touch-sensitive display associated with a first menu item of the set of menu items, the first menu item for selection of control of a first adaptive device of the set of adaptive devices. The operations further include, in response to detecting the first contact, displaying a set of control indicia associated with control functionality of the first adaptive device. The operations further include detecting a second contact on the touch-sensitive display associated with a first control indicia of the set of control indicia. The operations further include generating an actuation command associated with the first control indicia, the actuation command corresponding to a specific action of the adaptive device. The operations further include transmitting, using the wireless circuitry, the actuation command to a wireless adapter device to which is coupled the adaptive device.

Therefore, advantages of the systems and methods implemented in accordance with some embodiments of the present disclosure include, but are not limited to, the design of a universal remote technology (to include the wireless adapter and the handheld electronic device) for multiple adaptive devices in a normally non-compatible technology environment. Those who are disabled or have impaired function and/or mobility can easily and seamlessly work through a single handheld electronic device to control many different adaptive devices. This interaction for purposes of controlling the adaptive device can be made even easier by using voice communication and other visual, audio, and tactile confirmatory signals generated by the handheld electronic device. Other advantages will be apparent to those skilled in the art of control technology associated with adaptive electronic equipment, as will discussed hereinafter.

FIG. 1 is a block diagram of a remote control system 100 including a wireless adapter 110 (also referred to as a wireless adapter device or apparatus) and a handheld electronic device 102 that can function as a wireless remote controller according to at least one embodiment. The remote control system 100 can further include a network 115 over which the handheld electronic device 102 and the wireless adapter 110 communication wirelessly, an optional standard wired remote 105, a power supply 107 to provide power to the wireless adapter 110, two or more adaptive devices 120, and one or more other devices 130.

As discussed, the adaptive devices 120 can include, but not be limited to, wheelchair cranes, lifts (for individuals or wheelchairs), transfer seats, automated doors, truck bed toppers, gate openers, physical therapy equipment, and the like. A wheelchair lift or crane can lift a wheelchair into the back of a pickup truck, a van, or up and down a stairwell or set of stairs. A transfer seat can function to lift an individual up or down to position the individual to enter or exit a vehicle. A truck bed topper can automate opening and closing a topper or other cover to the truck bed. Automated doors can open and close a vehicle, home, or other location that the individuals frequent. Physical therapy equipment can include different types of exercise machines or negative resistance machines for injured individuals that are doing exercises to return mobility to limbs and joints or strength to the body generally. Such physical therapy equipment can also be specially adapted for those with spinal cord injuries and for whom it is especially difficult to operate conventional handheld remote control devices. The adaptive device 120 can also be an elevator that lifts or lowers a wheelchair. These are merely illustrative examples, where individual users can interact with a variety of different devices that are classifiable as electronic equipment with a combination of hardware and software to control that hardware. The other devices 130 can include other automated devices that may not necessarily be "adaptive," such as lights, air conditioning, heat, and the like.

In some embodiments, the wireless adapter 110 further includes, but is not limited to, a set of input ports 112, a set of output ports 114, wireless circuitry 116, a processing device 118, and one or more digital-to-analog converter (DAC) 119. The standard wired remote 105 can be connected to one of the input ports 112, e.g., via an input harness 105A such as an 8-way Molex cable. The term "harness" can be understood to refer to a set of bundled wires with a connector at each end of the bundle of wires, e.g., to form a multi-wire cable. For an 8-way Molex cable, each connector can include eight pins. Each adaptive device 120 and each other device 130 can be connected to one of the output ports 114 via an output harness 125. For example, each adaptive device 120 can be connected to an output port 114 via an output harness 125A and each other device can be connected to an output port 114 via an output harness 125B. In some embodiments, one or more adaptive device 120 can be daisy-chained (e.g., via another output harness 125A or 125B) to another adaptive device 120.

In these embodiments, the one or more DAC 119 can be coupled between the processing device 118 and one or more of the output ports 114. Each DAC 119 can convert the actuation bits generated by the processing device 118 to an analog signal before being sent over the output harness 125. The one or more DAC 119 is indicated as optional because each DAC 119 can alternatively be including within the processing device 118 or integrated with the one or more output ports 114.

In embodiments, some of the output harnesses 125 can be customized so that a first connector at the output port end (e.g., an input connector) is sized to fit within an output port 114 and that has a set of pins that is compatible with a set of first pins of the output port 114. A second connector (e.g., an output connector) of the first harness can be sized to fit within an input port (e.g., a control port) of the adaptive device 120 and that has a set of pins that is compatible with a set of second pins of the input port. Each output harness 125 can be an 8-way Molex cable or some other type of harness cable. At least the connector that connects into the adaptive devices 120 or 130 can further be a Molex 6-pin connector, a Molex 3-pin connector, a 5-pin straight connector, a 5-pin quick connector, a 6-position circular connector plug, and the like.

In various embodiments, the network 115 can be any number of communications networks, such as, for example, a cellular network, a radio frequency (RF) network, a personal area network (PAN), a local area network (LAN), or a portion of a wide area network (WAN). For example, the cellular network can be based on different generations of telecommunications technology, such as 3G, 4G, 5G, data services such as Universal Mobile Telecommunications System (UMTS), or a combination thereof. The RF network can be based on WiFi (of the WiFi Alliance®), e.g., with particular use of 2.4 GHz and/or 5 GHz links, or infrared technology. The PAN can be based on Bluetooth® (of the Bluetooth Special Interest Group), Zigbee™ technology, other wireless PANs, which can also be a wireless mesh network. The LAN can be based on a combination of Ethernet and RF wireless technology, to include IEEE 802.11 or similar protocols, and can be connected to the Internet or a cloud. Thus, the wireless circuitry 116 can be adapted to communicate with the handheld electronic device 102 using circuitry that is compatible with at least one of cellular, RF, LAN, PAN, or WAN technology associated with the network 115.

In various embodiments, the processing device 118 can be a microprocessor, a programmed processor, such as an application-specific integrated circuit (ASIC), a digital signal processor (DSP), a combination thereof, or other control logic or processing circuitry capable of performing the operations disclosed herein with reference to the wireless adapter 110. These operations can include interfacing with or including the wireless circuitry 116 and having a local memory (not illustrated) sufficient to execute any number of instructions in software and/or firmware.

Figure 2A:
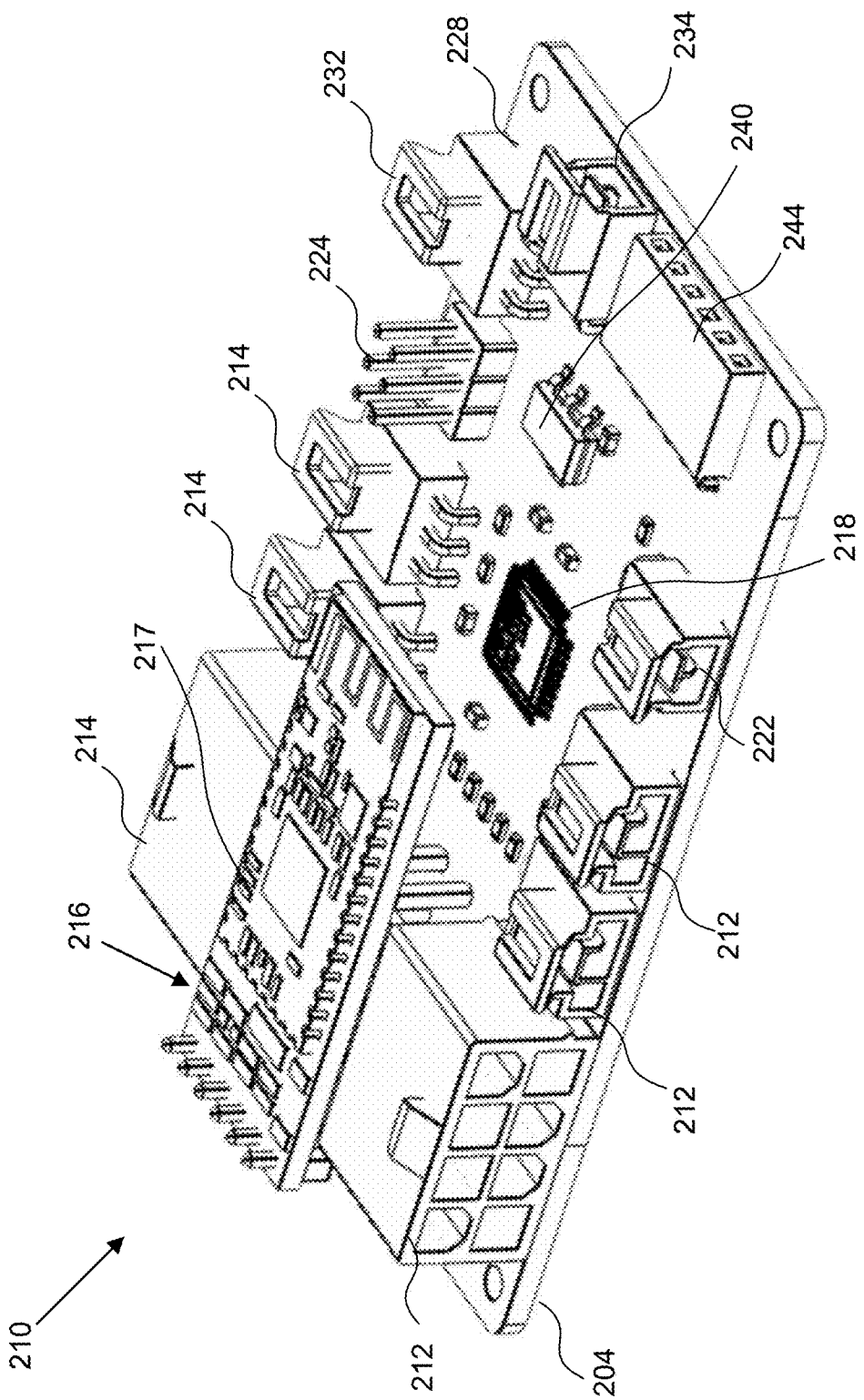
FIG. 2A is a first side perspective view of a wireless adapter according to an embodiment.
Figure 2B:
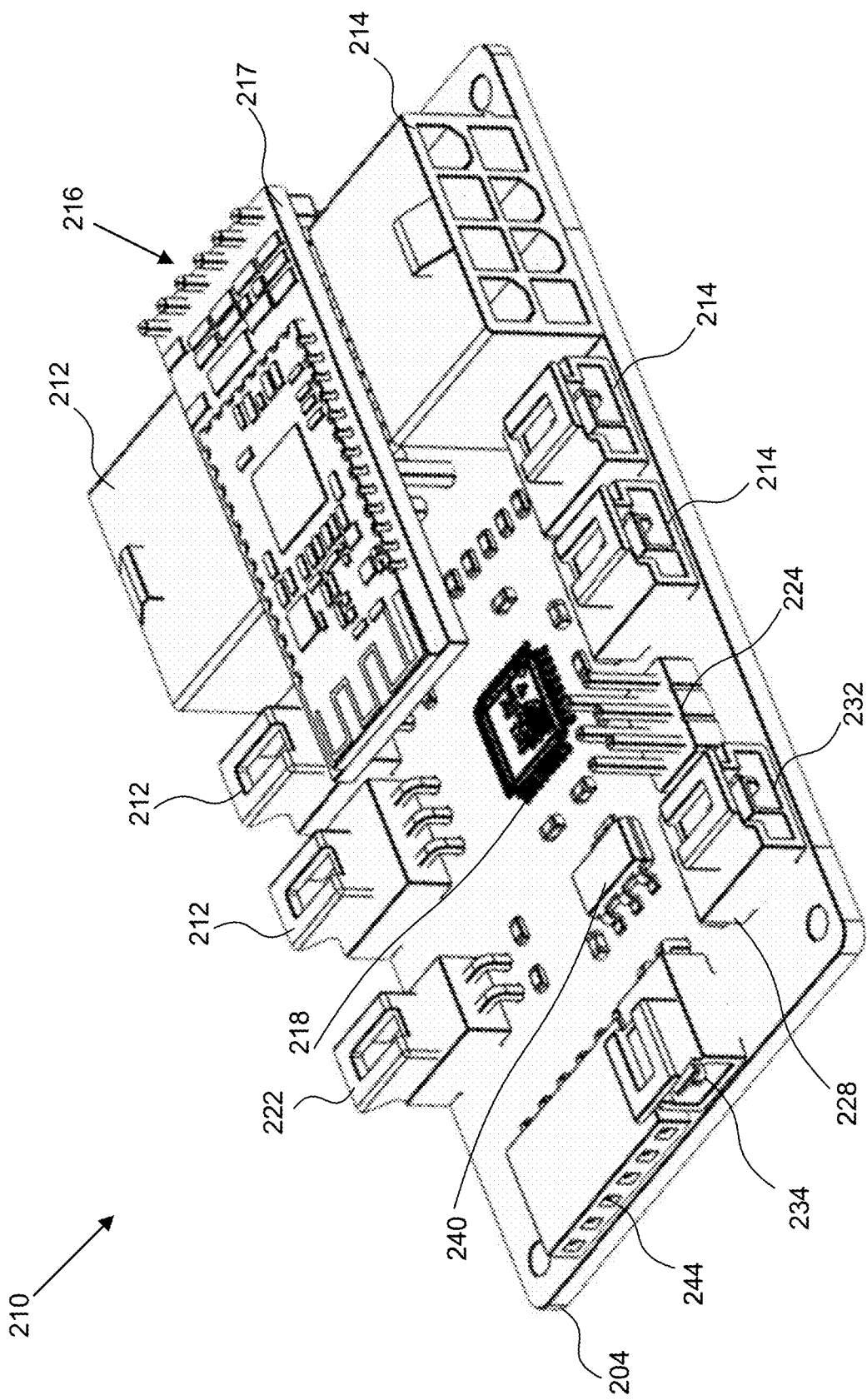
FIG. 2B is a second side perspective view of the wireless adapter according to an embodiment.

FIG. 2A is a first side perspective view of a wireless adapter 210 according to an embodiment. FIG. 2B is a second side perspective view of the wireless adapter 210 according to an embodiment. In one embodiment, the wireless adapter 210 is the wireless adapter 110 of FIG. 1, except now adding some additional detail, where similarly numbered components can be considered to be the same or similar to the component of the wireless adapter 110.

In various embodiments, the wireless adapter 210 includes a printed circuit board (PCB) 204 or other electrical board such as a control board. These embodiments further include a set of input ports 212 (some of which can vary in size and number of pins), a set of output ports 214 (some of which can vary in size and number of pins), and a processing device 218 disposed on the PCB 204. The wireless adapter 210 can further include wireless circuitry 216, which can be disposed on a separate communication board 217, be disposed on the PCB 204 itself, or optionally integrated within the processing device 218. One of the output ports 214 can have a set of first pins and be coupled to the adaptive device 120 via the output harness 125A (FIG. 1).

In these embodiments, the processing device 218 can identify, via the wireless circuitry 216, an actuation command from a wireless signal received from the handheld electronic device 102 over the network 115. The processing device 218 can further translate the actuation command to one or more actuation bits that match one of analog-converted bits receivable over the input harness 125A (FIG. 1) or digital control bits receivable over a wireless controller associated with the adaptive device (e.g., like the standard wired remote 105, only which is wireless). The processing device 218 can further provide the actuation bits to one or more of the first pins of one of the output ports 214, the actuation bits to cause the adaptive device to perform a specific action. The actuation bits can correspond to one or more discrete actions, each discrete action being associated with a bit of the actuation bits and a pin of the set of first pins.

In some embodiments, the wireless adapter 210 further includes an in-system programming (ISP) connector 224 disposed on the PCB 204 and coupled to the processing device 218, a Hall effect chip 228 optionally disposed on the PCB 204 and coupled to the processing device, and a Hall cable connector 232 disposed on the PCB 204 and coupled with the processing device 218. In these embodiments, the ISP connector 224 (also sometimes known as an in-circuit serial programming (ICSP) connector) can be attached to an external programing cable to enable programming the processing device 218 while installed in a completely assembly wireless adapter 210. The ISP connector 224 can also enable firmware updates to be delivered to an on-chip memory of the processing device 218, e.g., microcontroller or related processor without requiring specialist programming circuitry on the board.

In various embodiments, the wireless adapter 210 further includes a power connector 234 disposed on the PCB 204 to receive power from a power supply (FIG. 4) for the wireless adapter 210. The wireless adapter 210 can further include a step-down voltage converter 240 coupled to the power connector 234 and which is to step down voltage received from power supply, e.g., so that the power supplied to the components and other circuitry disposed on the PCB 204 is sufficient yet not too high. The wireless adapter 210 can further include a programming interface 244 to receive a further programming connector to facilitate programming of the processing device 218 and/or other circuitry or settings of the disposed electrical components disposed on the PCB, e.g., by loading a boot loader onto the wireless adapter 210 that enables performing a load of the programming.

Figure 3A:
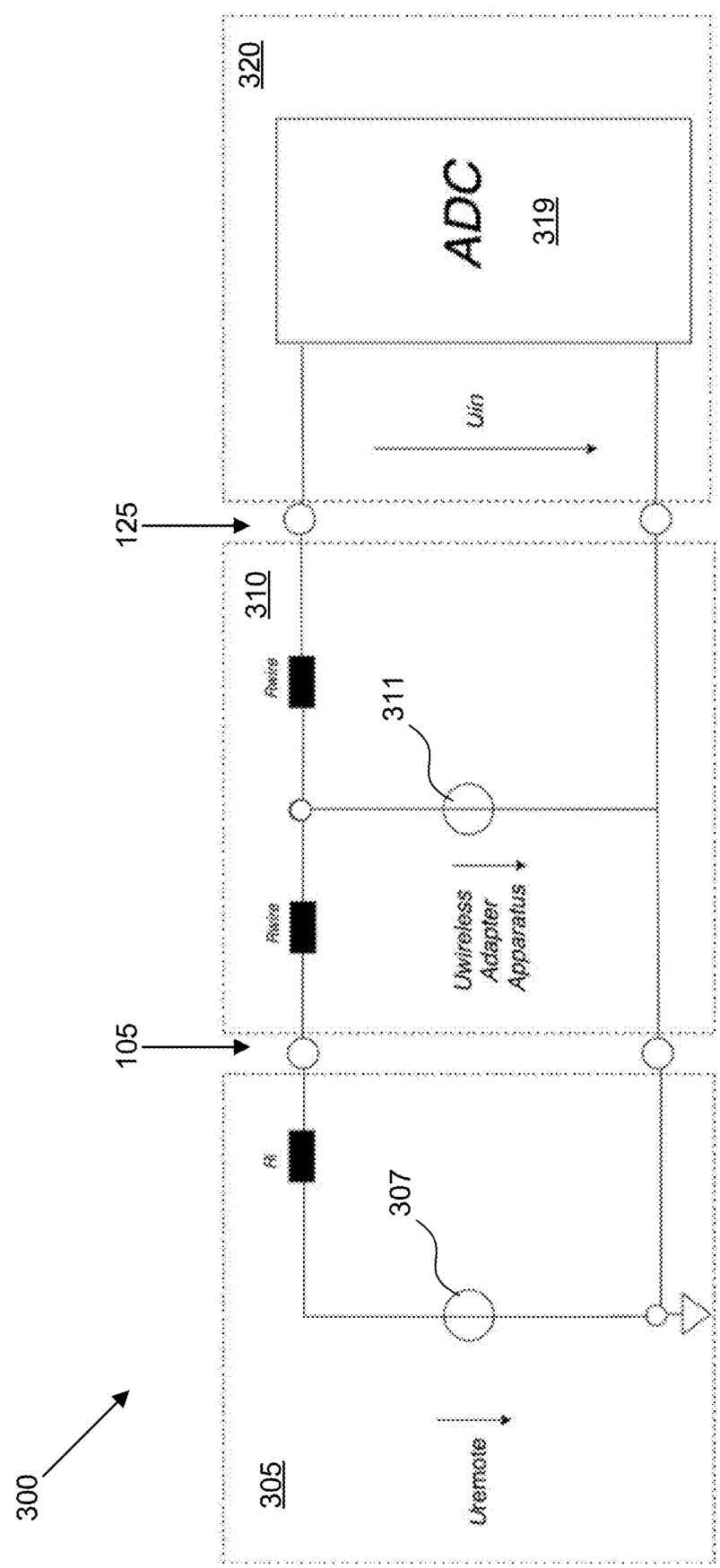
FIG. 3A is a schematic block diagram of a system including a wired remote control coupled to a cable adapter that is to actuate an adaptive device through a typical harness according to at least one embodiment.

FIG. 3A is a schematic block diagram of a system 300 including a wired remote control 305 coupled to a wireless adapter 310 (such as the wireless adapter 110 or 210) that is to actuate an adaptive device 320 through a typical harness according to at least one embodiment. More specifically, the wired remote control 305 generates an analog signal from a voltage source 307 and input resistance (Ri) that is transmitted through an input harness 105A to the wireless adapter 310. The wireless adapter 310 can further boost and protect the analog signal with a second voltage source 311 and some additional wire resistance (Rwire) before sending the refresh analog signal over an output harness 125 to the adaptive device 320. In this way, the wireless adapter 310 acts as a pass-through device for the analog signal when the wired remote control 305 is employed. The adaptive device 320 can include an analog-to-digital converter (ADC) 319 to convert the analog signal to a digital signal that directs a controller (or some control logic) of the adaptive device 320 in performing a specific action.

Figure 3B:
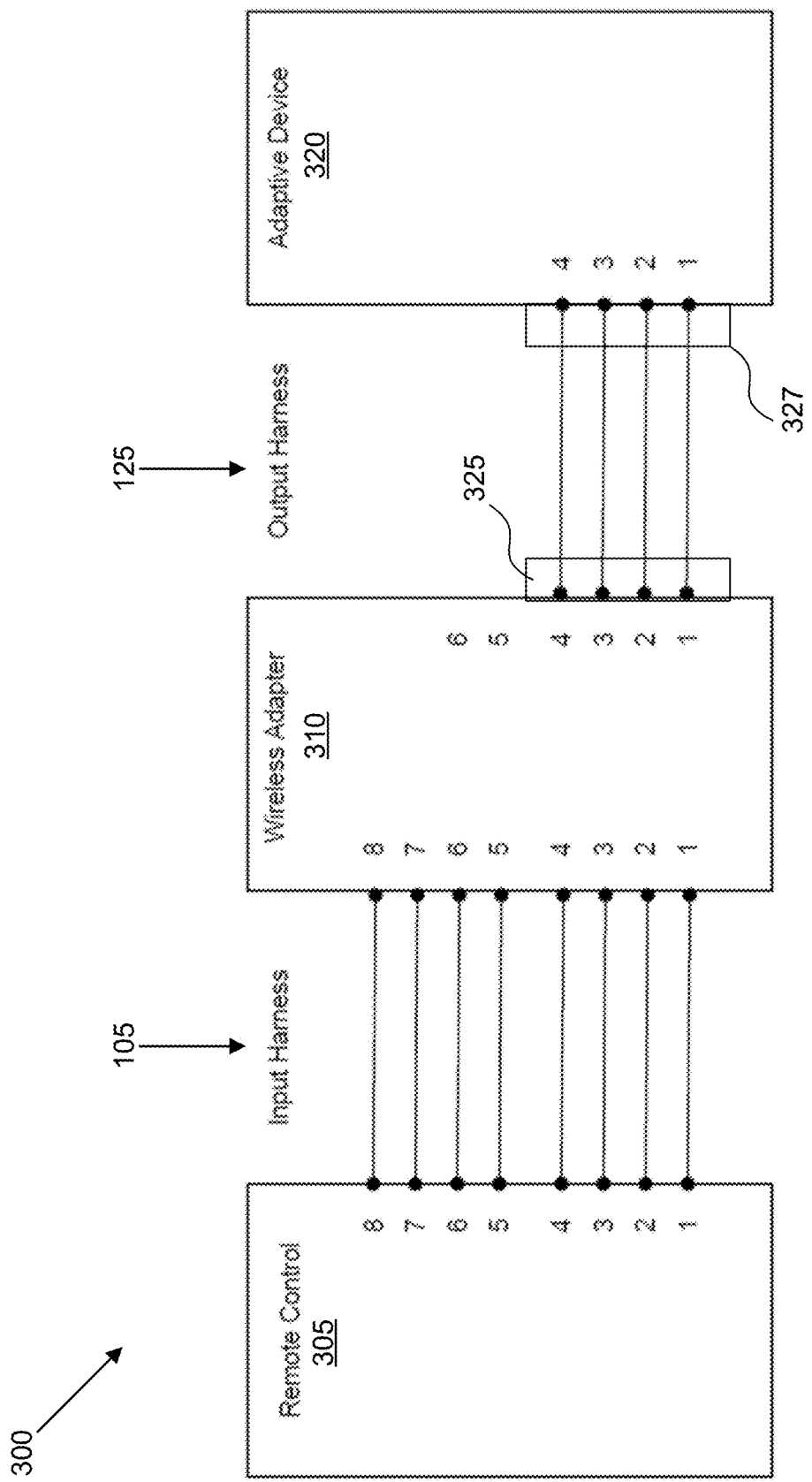
FIG. 3B is a schematic block diagram associated with the wired remote control of FIG. 3A, to illustrate pin connections according to at least one embodiment.

FIG. 3B is a schematic block diagram associated with the wired remote control 305 of FIG. 3A, to illustrate pin connections according to at least one embodiment. For example, in one embodiment, the input harness 105A is an 8-pin harness (e.g., 8-way Molex cable), and thus the output port of the remote control 305 and the input port 112 of a wireless adapter (such as the wireless adapter 110 or 210) can also include eight pins. These ports, and the use of the wired remote control 305, can provide a back-up that can be connected at time of installation or later if the wireless circuitry 116 or 216 of the wireless adapter 310 happens to fail. Providing the wired remote control 305 as a backup could help avoid the situation where a user is stranded without a way to access a vehicle, a home, or an important means of transportation just because wireless control has went down even if temporarily.

In some embodiments, the output harness 125 is instead a 4-way harness (or some N-way harness other than 8-way) to couple the output port 114 of the wireless adapter 310. Thus, the N pins (or four pins in this example) of the harness only need to connect to four pins of the output port 114 of the wireless adapter 310 such as pins 1-4 of six available pins. In embodiments, the output harness 125 is customized so that a first connector 325 at the output port end is sized for the output port 114 and that has a set of pins that is compatible with a set of first pins of the output port 114. A second connector 327 of the output harness 125 can be sized for connection to an input port (e.g., a control port) of the adaptive device 120 and that has a set of pins that is compatible with a set of second pins of the input port. Because the wireless adapter 310 acts as a pass-through for an analog signal from eight pins of the input harness 105A to four pins of the output harness 125, the first set of eight pins of the input port 112 can be coupled to the second set of four pins of the output port 114 using a predetermined mapping between the input harness 105A of the wired remote control and the output harness 125. This predetermined mapping can ensure that the analog signal properly passed, and serialized if necessary, into the fewer number of pins of the output harness 125.

Figure 4:
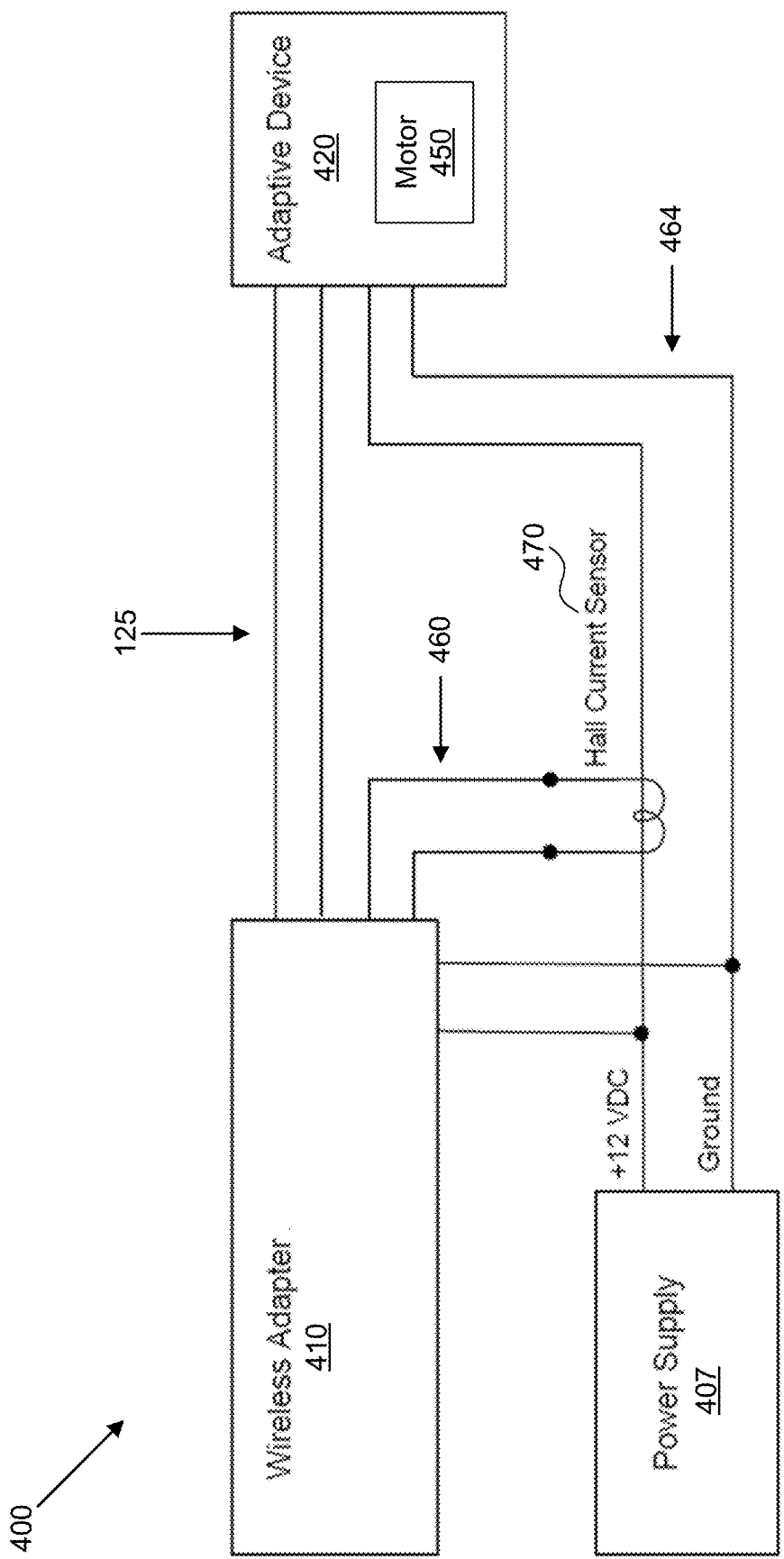
FIG. 4 is a schematic block diagram of a system that includes wireless adapter that employs Hall effect current sensing to prevent an over-current condition with reference to an adaptive device according to at least one embodiment.

FIG. 4 is a schematic block diagram of a system 400 that includes wireless adapter 410 that employs Hall effect current sensing to prevent an over-current condition with reference to an adaptive device according to at least one embodiment. The wireless adapter 410 can be any of the wireless adapters 110, 210, or 310 illustrated herein. The system 400 can further include a power supply 407 (such as the power supply 107) and an adaptive device 420 (such as one of the adaptive devices 120). The power supply 407 can provide power to both the wireless adapter 410 and the adaptive device 420 over separate power cables. The adaptive device 420 can include a motor 450 that is operatively coupled to one or more linkages to move mechanical structures (such as lifts, arms, pulleys, and the like) that cause the adaptive device 420 to function.

In these embodiments, the system 400 further includes a Hall cable 460 to be connected between the Hall cable connector 232 (FIGS. 2A-2B) and a power cable 464 that runs between the power supply 407 and the motor 450. The Hall cable 460 includes a Hall effect sensor 470 (e.g., a current sensor) that is coupled to the power cable 464 in order to sense a current within the power signal provided to the motor 450. In these embodiments, the processing device 218 can use the Hall effect sensor 470 to detect that current supplied to the motor 450 has reached a threshold current value for a predetermined period of time, and, in response to such detection, signal the motor 450 to shut off to protect the motor from an over-current condition.

For example, in the event the Hall effect sensor 470 continues to receive current when motor 450 (and/or motor linkage) has reached its endpoint, the processing device 218 can register a further increase in the current and initiate a fail-safe protocol that shuts down current to the adaptive device 420 by the power supply 407 to avoid damage. Thus, due to an accidental non-release of the button being pushed on the handheld electronic device 102, the wireless adapter 410 (e.g., by way of the processing device 218) initiates a "Stop Movement" command to prevent the adaptive device 420 from being damaged. This fail-safe protocol can stop current from flowing to the adaptive device 420 if the current flow reaches the threshold current value for more than a certain number of seconds, for example. This fail-safe protocol can protect the attached adaptive device 420 in the event that something causes the adaptive device 420 to stay in a movement mode or continues to supply a current flow to the adaptive device 420, e.g., a mobile phone that may have a cracked screen and fails to release from a touch to the control buttons or an object that gets stuck to the screen that initiates movement and fails to release or if the button is accidentally pressed for a period of time beyond the general operating time.

Figure 5A:
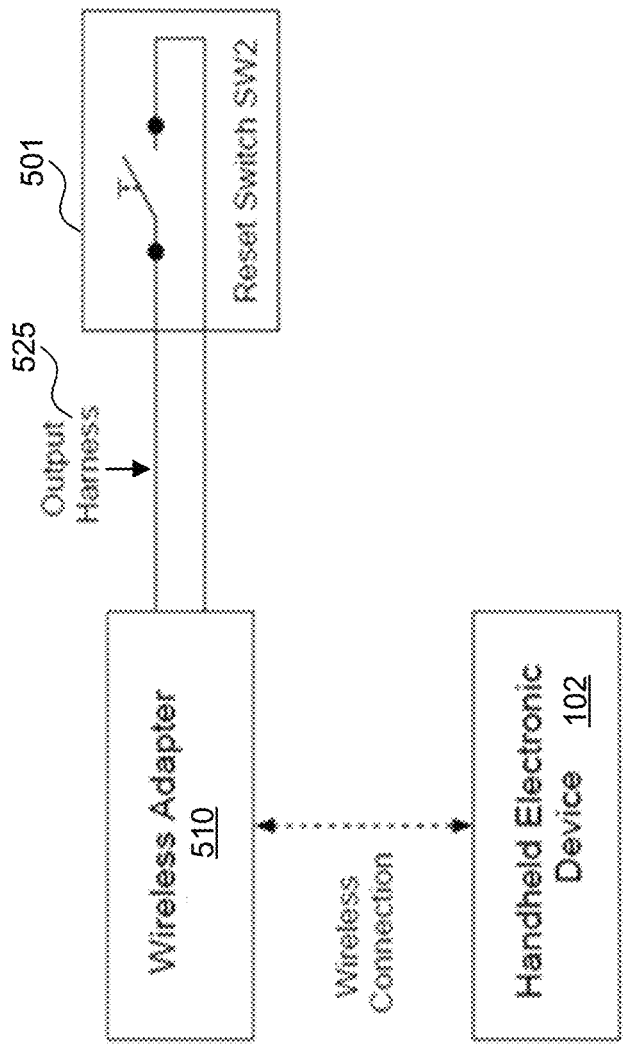
FIG. 5A is a schematic block diagram of a wired reset switch operatively coupled to the wireless adapter according to an embodiment.

FIG. 5A is a schematic block diagram of a wired reset switch 501 operatively coupled to a wireless adapter 510 according to an embodiment. The wireless adapter 510 can be any of the wireless adapters 110, 210, 310, or 410 disclosed herein. A harness 525 can be coupled between the wireless adapter 510 and the wired reset switch 501, thus making the wired reset switch 501 accessible by a user, e.g., that may be positioned in the front of a vehicle and thus out of reach of the wireless adapter 510 that may be installed in the back of a vehicle or closer to the adaptive device(s) being controlled. When the wired reset switch 501 is pushed or otherwise selected, the wires reset switch 501 initiates a reset of the wireless adapter 510, e.g., which can be understood as, in one embodiment, a reboot where power is disconnected briefly and reconnected again to the PCB 204. Other resets can be more isolated in being related to reinitiating the processing device 118 and the wireless circuitry 116, for example.

In the event, the operator of the adaptive device or adaptive equipment is disabled and has limited movement, the operator may be unable to enter the back of the vehicle to reset the equipment if it becomes inoperable. If the adaptive device stops working for any reason, then the user can rely on traditional remote controls or initiate a reset process that will reset and restore the original settings of the wireless adapter 510. While conflicts related to connected hardware devices are attempted to mitigated, there is always a small probability that the third party adaptive device may interfere with functioning of the wireless adapter 510, necessitating a reset or reboot. Providing a means by which to reset or reboot the adaptive device without forcing the end-user to exit their vehicle mitigates this issue and provides a safe environment to perform such a reset.

Figure 5B:
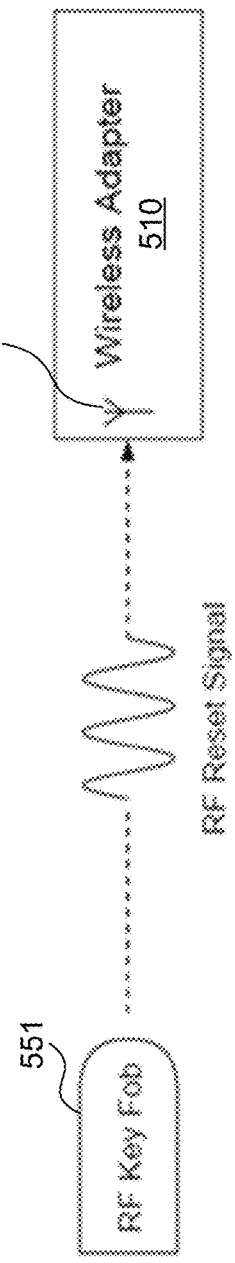
FIG. 5B is a schematic block diagram of a wireless reset switch operatively coupled to the wireless adapter according to an embodiment.

FIG. 5B is a schematic block diagram of a wireless reset switch 551 operatively coupled to the wireless adapter 510 according to an embodiment. In addition to, or in lieu of, the option of using the wired reset switch 501, the wireless adapter 510 the wireless reset switch 551 can be paired with a receiver 565 located on the wireless adapter 510, e.g., being disposed on the PCB 204. The receiver 565 can be integrated within the wireless circuitry 116 or 216 in some embodiments. In one embodiment, the wireless reset switch 551 is an RF (or other PAN-driven) key fob that can communicate with the receiver 565, which when selected, may also cause the wireless adapter 510 to be reset or rebooted to reinitiate the wireless adapter 510. In this way, the user can be enabled to reset/reboot the wireless adapter 510 without the need for tradition wires and switches that take up more room and can create an obstacle to mobility of the user within a vehicle, for example. Further, for individuals that are more severely disabled, being able to reach a key fob or the like that is attached to their person can be more convenient and easily reached than a wired reset switch 501 that might be attached at one location within the vehicle. This wireless option also accommodates the need to reset/reboot the wireless adapter 510 when the individual is outside of the vehicle.

Thus, in at least some embodiments, the system 400 (FIG. 1) further includes a reset switch coupled to the power supply 407. The reset switch can be coupled wired (e.g., the wired reset switch 501) or wirelessly (e.g., the wireless reset switch 551) to the power supply 407, which when activated, is to disconnect the PCB 204 from and reconnect the PCB 204 to the power supply 407 to reboot the wireless adapter 510, e.g., adapter device.

Figure 6:
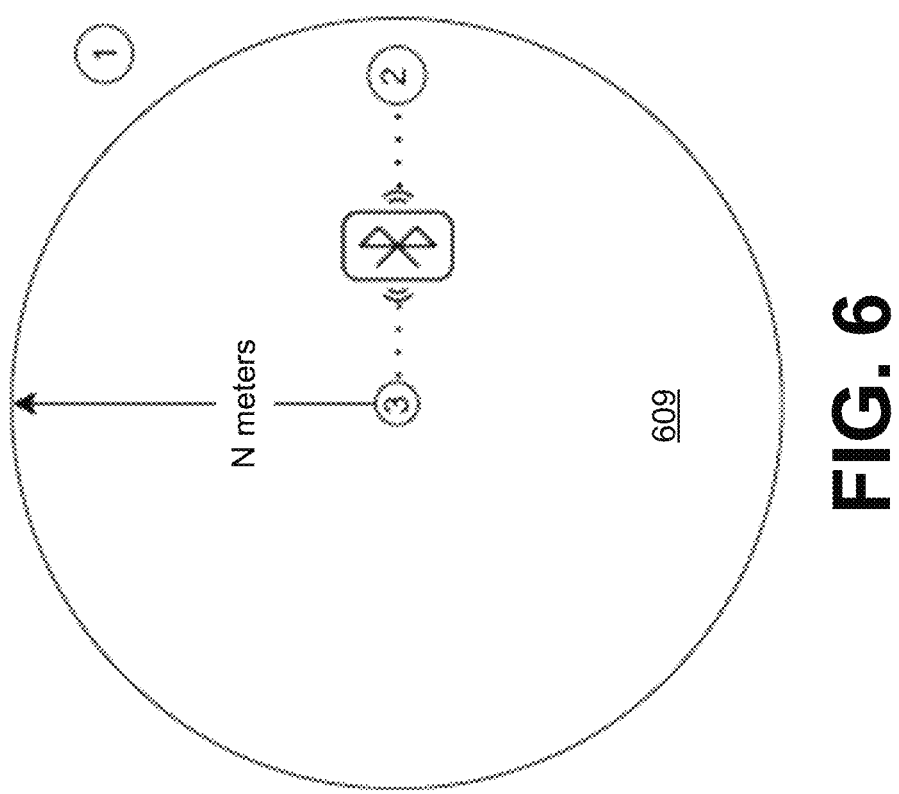
FIG. 6 is a diagram that illustrates zones of communication between the handheld electronic device and the wireless adapter when using a personal area network (PAN) for communication according to at least one embodiment.

FIG. 6 is a diagram that illustrates zones of communication between the handheld electronic device 102 and the wireless adapter 110 when using a personal area network (PAN) for communication according to at least one embodiment. The wireless adapter 110 can be any of the wireless adapters 110, 210, 310, 410, and/or 510 as discussed herein with reference to FIGS. 1-5B, and reference to the wireless adapter 110 should be understood as making reference to the other wireless adapters 210, 310, 410, and 510 as well. As illustrated, the PAN can be Bluetooth®, but others are envisioned such as Zigbee™. In these embodiments, assume the wireless adapter 110 is located at the center of a circular zone 609, as position 3 while the handheld electronic device 102 can be understood to be located somewhere outside of (e.g., at position 1) or inside of (e.g., at position 2) this circular zone 609. While position 1 may be out of range for connecting, using the PAN technology, to the wireless adapter 110, position 2 may be within range of connecting to the wireless adapter 110.

Only by way of example, assume the circular zone 609 can reach a distance of up to N meters in open space, which, consistent with a Bluetooth® 4.0 signal, can be 100 meters. In various embodiments, when the handheld electronic device 102 comes within range of the PAN technology employed for communication with the wireless adapter 110 (e.g., illustrated at position 2), the handheld electronic device 102 can automatically wirelessly connect with the wireless adapter 110, assuming a previous pairing between the two that ensures authenticated and secure communication only with paired handheld electronic devices. Because this is an auto-connection, a user with disabilities and limited movement need not take additional action. For example, in at least some embodiments, the wireless adapter 110 remains sufficiently powered to scan for and detect the PAN-based signal from the wireless adapter 110.

In some embodiments, the wireless adapter 110 (e.g., the processing device 118 in concert with the wireless circuitry 116) can detect, using the PAN technology, that the handheld electronic device 102 is within a predetermined distance of the wireless circuitry 116. The wireless adapter 110 can send a signal to the handheld electronic device 102 to initiate a voice prompt through a speaker of the handheld electronic device 102 that requests whether a user desires that the adaptive device be deployed. Further, in response to an affirmative response signal received from of the handheld electronic device 102, the wireless adapter 110 can provide at least one of the one or more actuation bits to the first set of pins, e.g., of the output port 114.

Figure 7:
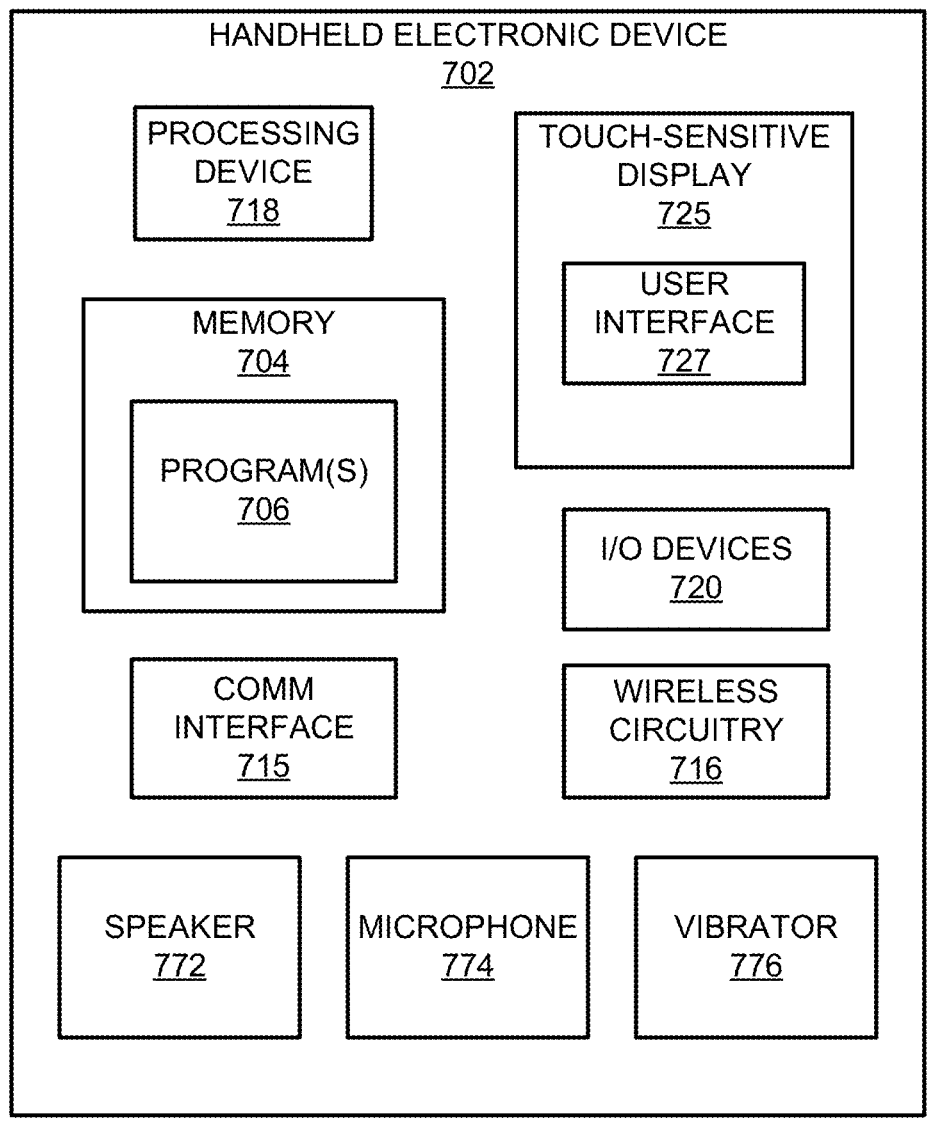
FIG. 7 is a block diagram of a handheld electronic device that can function as a wireless remote according to at least one embodiment.

FIG. 7 is a block diagram of a handheld electronic device 702 that can function as a wireless remote according to at least one embodiment. In some embodiments, the handheld electronic device 702 is the handheld electronic device 102 of FIG. 1. The handheld electronic device 702 can include, but not be limited to, a memory 704 to store one or more programs 706 made up of instructions, wireless circuitry 716, a communication interface 715 (which might be separate from the wireless circuitry 716), a processing device 718, input/output (I/O) devices 720 that are not already illustrated, a touch-sensitive display 725 in which to display a user interface 727, a speaker 772, a microphone 774, and a vibrator 776. The wireless circuitry 716 can be coupled to the processing device 718 and include compatible technology to that of the wireless circuitry 116 and 216 of the wireless adapter 110 and 210, for example. The touch-sensitive display 725 can be a touch screen, a touch panel, a touch pad, a touch screen monitor, a touch-sensitive screen, or the like. The other I/O devices 720 can include a joystick, click wheels, scrolling wheels, a stylus, key pads, cameras, light emitting diodes (LEDs), and the like.

The memory 104 and the processing device 118 can also include non-transitory computer-readable medium (or media) that store instructions. A "computer-readable medium," "computer-readable storage medium," "machine readable medium," "propagated-signal medium," and/or "signal-bearing medium" can include any device that includes, stores, communicates, propagates, or transports software for use by or in connection with an instruction executable system, apparatus, or device. This machine-readable medium can selectively be, but not limited to, an electronic, magnetic, optical, electromagnetic, infrared, or semiconductor system, apparatus, device, or propagation medium.

In some embodiments, the one or more programs 706 (e.g., software) are stored in the memory 704 and configured to be executed by the processing device 718. The one or more programs 706 can include instructions for displaying the user interface 727 on the touch-sensitive display 725. The user interface 727 that is displayed can include a set of menu items associated with a plurality of adaptive devices (see FIG. 8A). The one or more programs 706 can include instructions for detecting a first contact on the touch-sensitive display 725 associated with a first menu item of the set of menu items. The first menu item can be for selection of control of a first adaptive device of one or more adaptive devices 120. For example, the first contact can be one of a hover, a tap, or a press-and-hold action on the first control indicia. If a press-and-hold action, the commands that are sequentially generated can terminate upon the pressed contact being released.

Figure 9A:
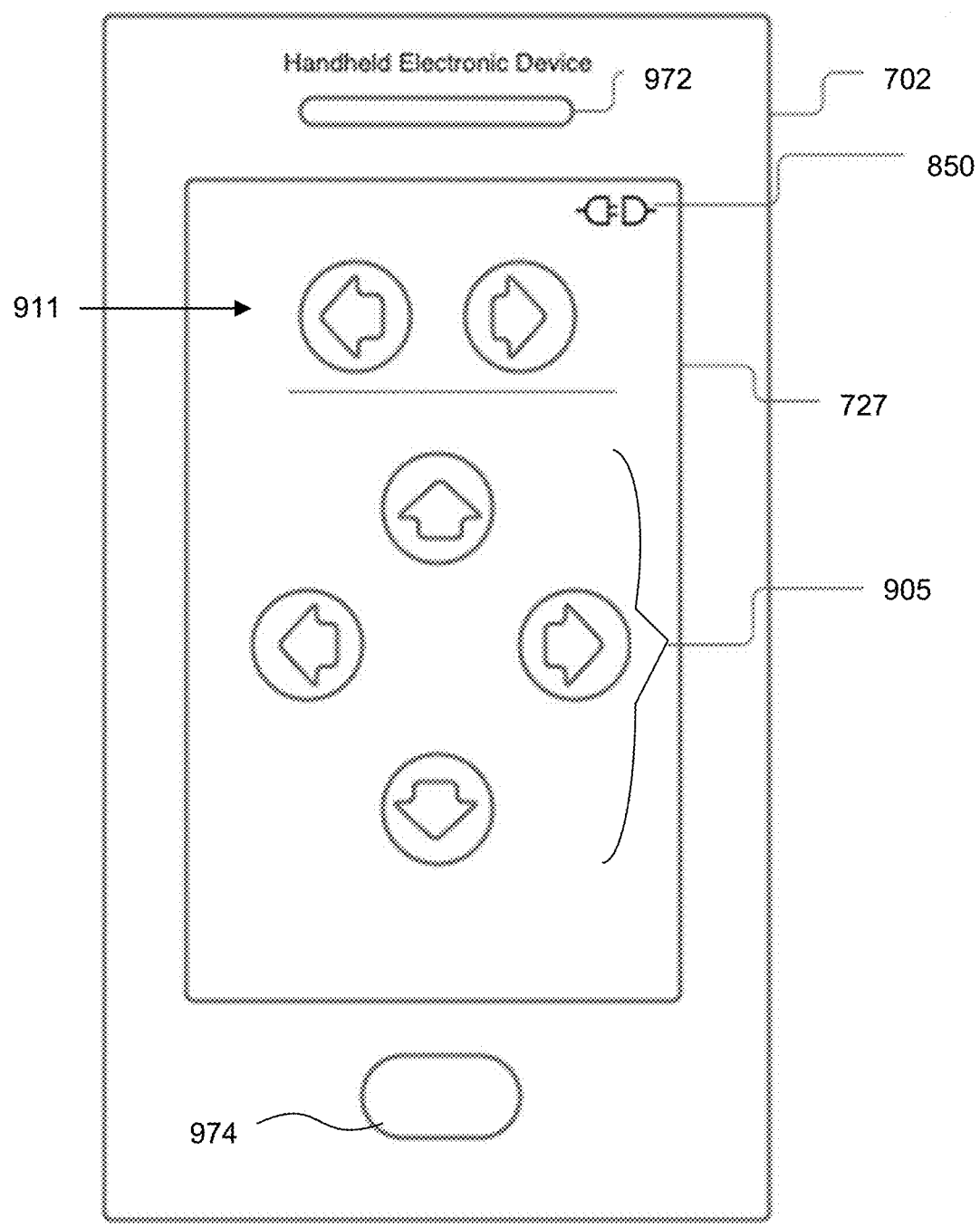
FIG. 9A is an interface diagram of an handheld electronic device illustrating a set of control indicia on a touch-sensitive display according to at least one embodiment.

In response to detecting the first contact, the instructions can further be executed for displaying a set of control indicia associated with control functionality of the first adaptive device, e.g., as illustrated in FIG. 9A. The instructions can further be executed for detecting a second contact on the touch-sensitive display 725 associated with a first control indicia of the set of control indicia. For example, the second contact can be one of a hover, a tap, or a press-and-hold action on the first control indicia.

With additional reference to FIG. 7, the one or more programs 706 can include instructions for generating an actuation command associated with the first control indicia, the actuation command corresponding to a specific action of the adaptive device. For example, the specific action can be one of up, down, in, out, open, or close at least a portion of the adaptive device 120. The instructions can further be executed for transmitting, using the wireless circuitry 116 or 216, the actuation command to a wireless adapter 110 (e.g., wireless adapter device) to which is coupled the adaptive device 120 or 130.

In some embodiments, the one or more programs 706 further include instructions for detecting, using the previously-discussed PAN technology, that the handheld electronic device 702 is within a predetermined distance of the wireless adapter 110, e.g., within the circular zone 609 illustrated in FIG. 6. The instructions can further be executed for initiating, through the speaker 772, a voice prompt that requests whether a user desires that the adaptive device 120 be deployed. Responsive to detecting an affirmative response via the microphone 774, the instructions can be executed for sending a second actuation command to the wireless adapter 110. Additional functionality of the handheld electronic device 702 be further described with reference to FIGS. 8A-10.

Figure 8A:
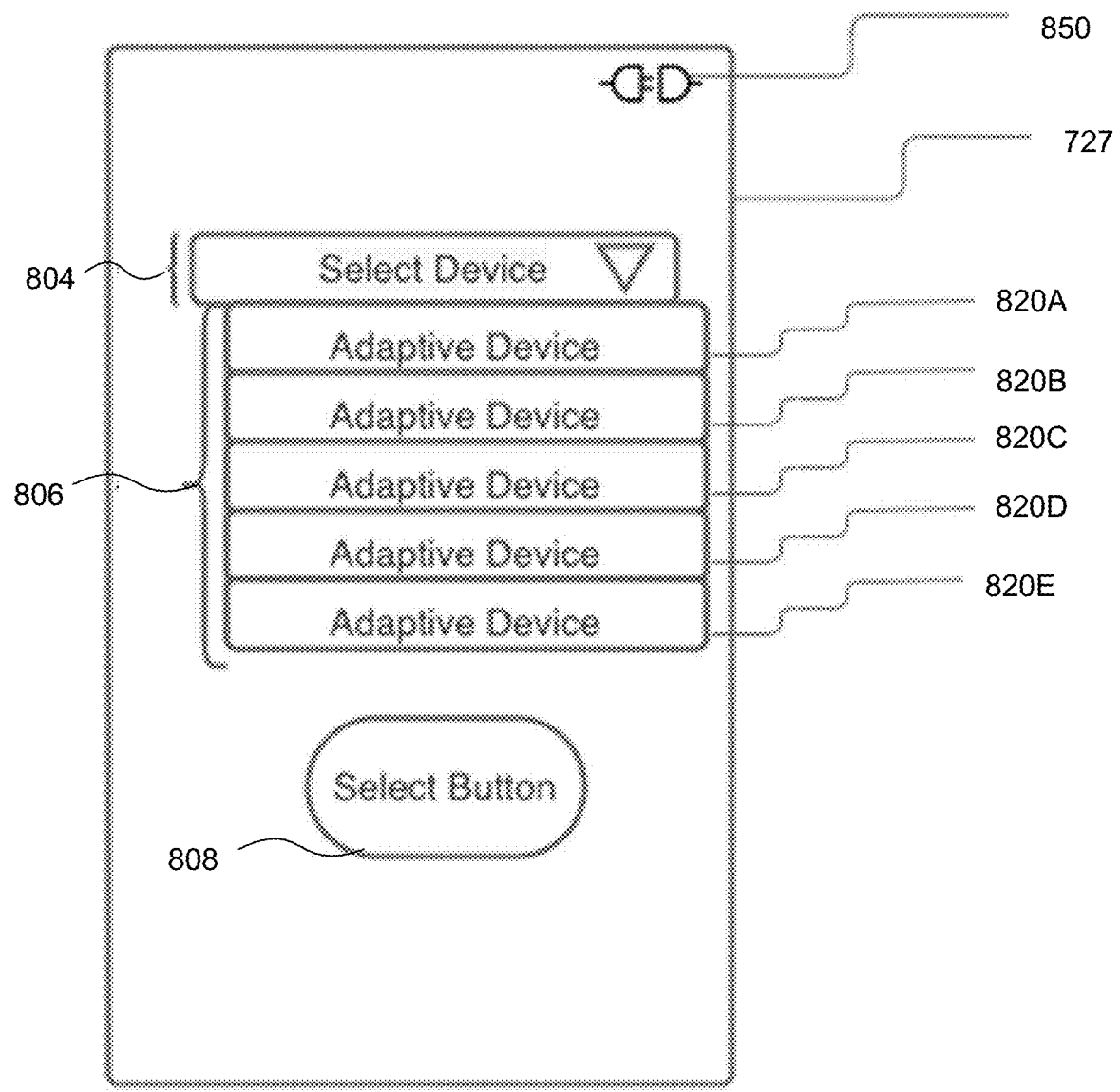
FIG. 8A is an interface diagram of a user interface for selection of an adaptive device according to at least one embodiment.

FIG. 8A is an interface diagram of the user interface 727 for selection of an adaptive device according to at least one embodiment. The user interface 727, for example, can display a drop-down menu 804 from which a list or set of menu items 806 is displayed in response to selection of the drop-down menu 804. For example, the set of menu items 806 can include indicia representing a first adaptive device 820A, a second adaptive device 820B, a third adaptive device 820C, a fourth adaptive device 820D, a sixth adaptive device 820E, or more. The user can select, e.g., via a first contact with the touch-sensitive display 825, any of the adaptive devices directly from the set of menu items 806, and optionally may need to tap on a select button 808 in order to actually bring up a set of control indicia corresponding to the selected adaptive device.

In some embodiments, the one or more programs 706 include instructions for generating a confirmatory signal associated with successful detection of the first contact, e.g., through the touch-sensitive display device 825. The confirmatory signal can be one of an audible sound from the speaker 872, a vibration from the vibrator 876, or a visual signal 850 via the user interface 727. This confirmatory signal may therefore confirm for the user that is holding the handheld electronic device 702 that a successful selection of one of the adaptive devices has been made.

Figure 8B:
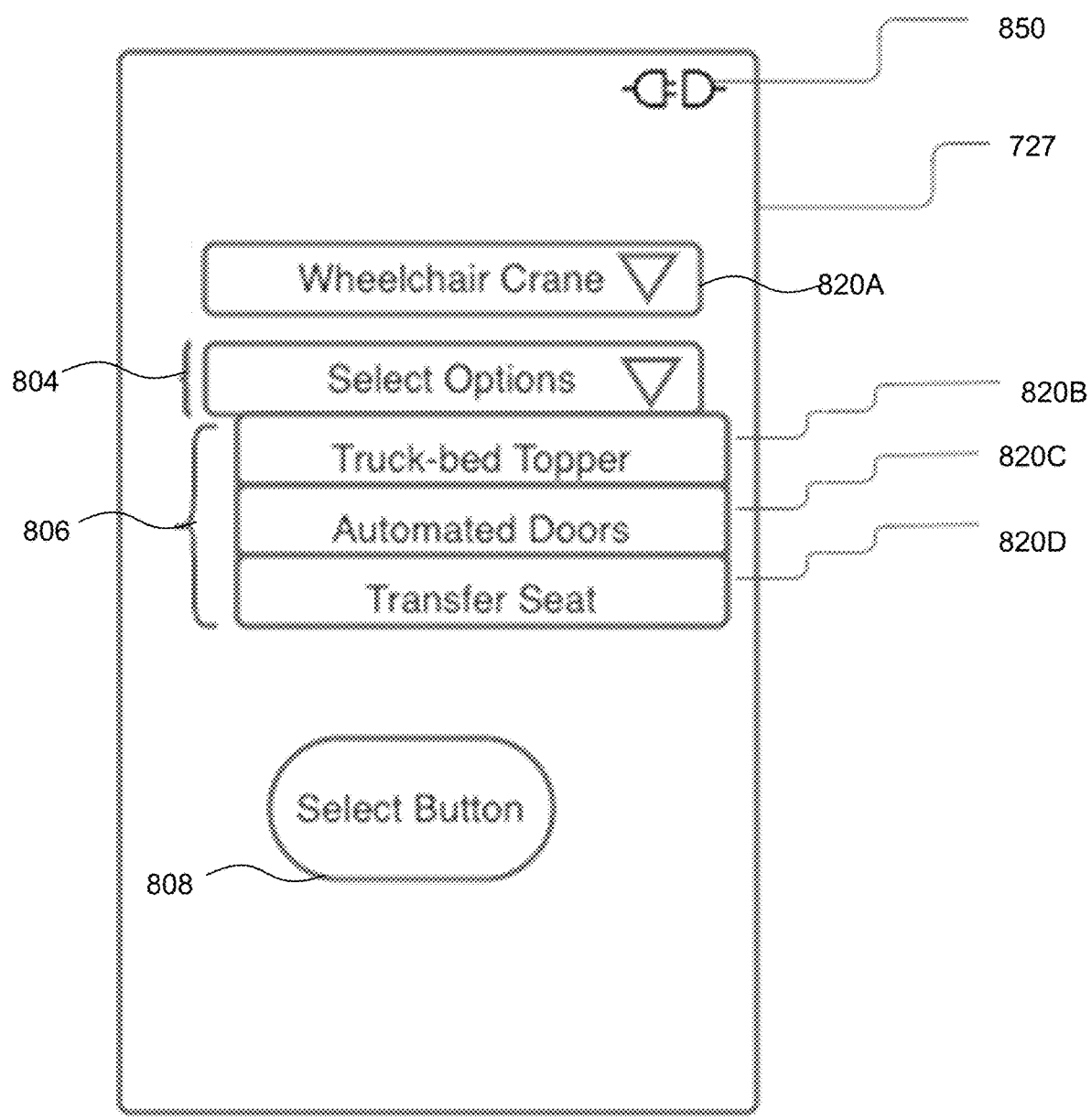
FIG. 8B is an interface diagram of a user interface for selection of an additional adaptive device according to at least one embodiment.

FIG. 8B is an interface diagram of the user 727 interface for selection of an additional adaptive device according to at least one embodiment. For example, further to user interface 727 example of FIG. 8A, assume the first adaptive device 820A that was selected is a wheelchair crane, although other lift-based adaptive devices may also be selected. A user can further select an additional adaptive device from the drop-down menu 804, e.g., from the set of menu items 806. For example, suppose that the second adaptive device 820B is a truck bed topper, the third adaptive device 820C is a set of automated doors, and the fourth adaptive device 820D is a transfer seat or physical therapy equipment. Upon detecting another contact selective of an additional adaptive device, the instructions can be executed to cause control indicia associated with both or a combination of the first adaptive device 820 and, e.g., the second adaptive device 820B through the user interface 727. An example of such control indicia is discussed with reference to FIG. 9C, discussed below. A further confirmatory signal 850 can be generated to help the user verify that a communication link has been established with the additional adaptive device through the wireless adapter 110.

FIG. 9A is an interface diagram of the handheld electronic device 702 (FIG. 7) illustrating a set of control indicia 905 on the touch-sensitive display 725 according to at least one embodiment. The handheld electronic device 702 can further include a speaker port 972 through which the speaker 772 can emit sound and a microphone port 974 through which the microphone 774 can receive sound, the latter of which can also be an audio jack, a Universal Serial Bus (USB) port, and the like. The set of control indicia can be associated with specific actions to be carried out by at least a portion of (e.g., linkages of) the adaptive device 720A-720E. Assume, for purposes of explanation, that the selected adaptive device is the wheelchair crane of FIG. 8B. Therefore, the set of control indicia 905 can include in, out, left, right, up, and down. In some embodiments, each control indicia of the set of control indicia, once selected, can cause optional additional control indicia 911 to be displayed in a central or upper portion of the user interface 727.

In one embodiment, upon successful selection of the "up" control indicia, the handheld electronic device 702 can detect the selection through the touch-sensitive display screen 725, formulate an actuation command, and send the actuation command (e.g., using the wireless circuitry 716 and the communication interface 715) to the adaptive device 120. The adaptive device 120 can then translate the actuation command and thereby force the wheelchair crane to lift up the wheelchair to which it is attached. The user can select the "up" control indicia more than once (e.g., incrementally) or simply touch and hold the "up" control indicia of the set of control indicia 905 until the wheelchair reaches a desired height and then let go. While the "up" control indicia is pressed, the wheelchair crane can lift the wheelchair at a fixed rate determined to be safe for the adaptive device. The user can also then select any number of additional control indicia of the set of control indicia 905 in order to move the wheelchair to a desired position, such as to the back of a pickup truck or a van.

In some embodiments, the handheld electronic device 702 can further receive, via the wireless circuitry 716, a return signal from the wireless adapter device 710 that indicates successful execution of the actuation command. The handheld electronic device 702 can further generate, responsive to receiving the return signal, a second confirmatory signal including audible sounds or words from the speaker 772, a second vibration from the vibrator 776, or the visual signal 850 via the user interface 727.

In various embodiments, the handheld electronic device 702 also creates a user profile for each specific user that is using the adaptive devices and controlling them with the handheld electronic device 702. Upon selection and control of certain adaptive devices, the processing device 718 can add the adaptive device to the user profile, which can, for example, further be associated with a mobile application that is one of the programs 706 being executed and that is specially adaptive to interface with and control the adaptive devices. Upon reopening such a mobile application, previous settings and adaptive devices associated with the user profile can automatically be loaded and initiated, enabling the user to get access and control over these adaptive devices via the wireless adapter 110 very quickly. In some embodiments, the user profile and associated settings are stored in the memory 704 or in the cloud, e.g., on a server across the Internet.

Figure 9B:
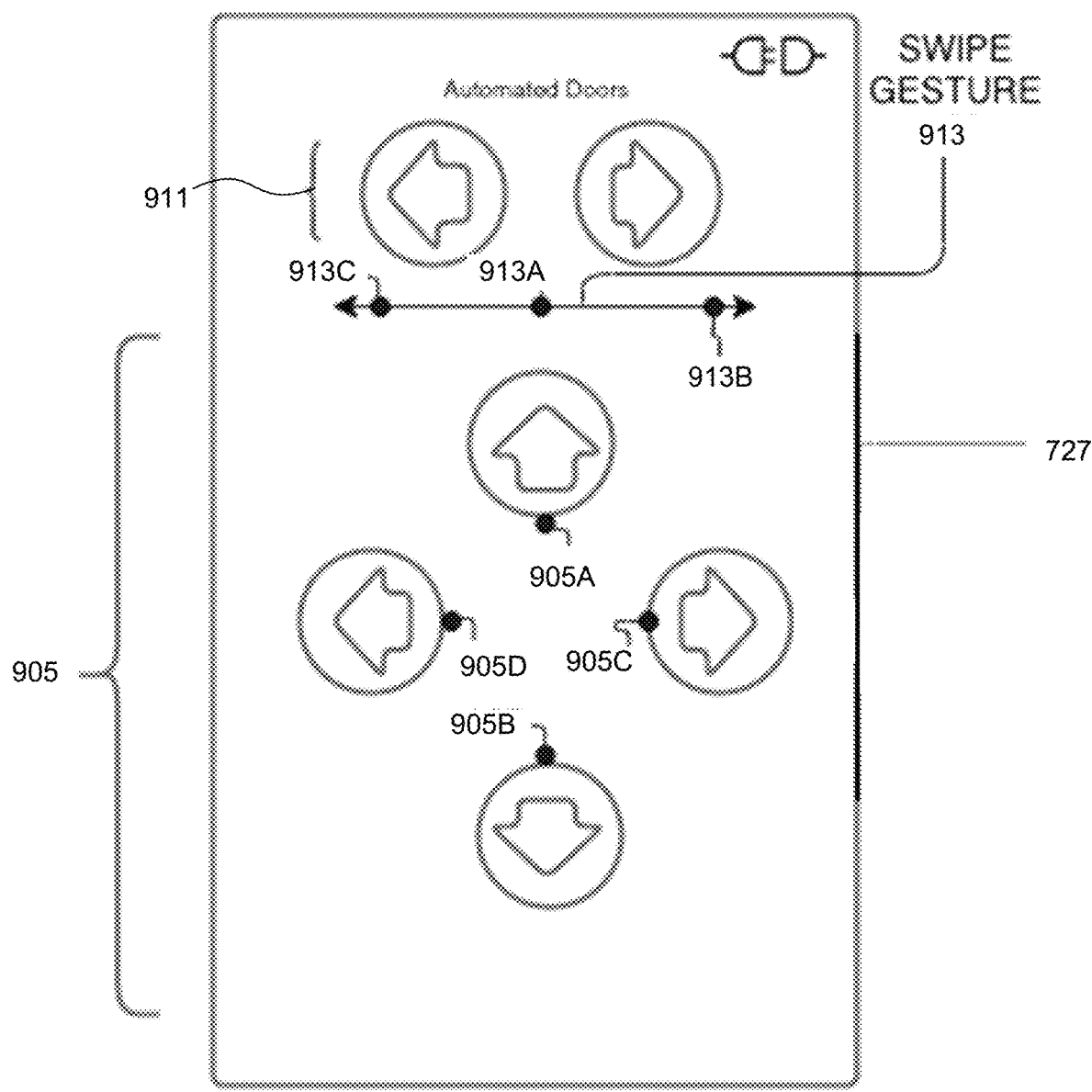
FIG. 9B is the interface diagram of FIG. 9A with additional swipe gesture functionality according to at least one embodiment.

FIG. 9B is the interface diagram of FIG. 9A with additional swipe gesture 913 functionality according to at least one embodiment. The set of control indicia 905 can further include, for example, an up control indicia 905A, a down control indicia 905B, a right control indicia 905C, and a left control indicia 905D. The user interface 727 can display a second set of control indicia 911 that is automatically displayed in the user interface 727 in response to selection of an additional adaptive device, e.g., in this example automated doors. In some embodiments, this second set of control indicia 911 includes a swipe region 913 that can also be associated with the additional adaptive device.

The swipe region 913 can include a particular area in which different portions (e.g., middle portion 913A, right portion 913B, and left portion 913C) of the particular area or swipe region 913 can correspond to different general positions of the additional adaptive device. So, for example, with reference to automated doors as the additional adaptive device, the right portion 913B can be fully closed, the middle portion 913A can be half-way open, and the left portion 913C can be fully open, thus providing a continuum of control capability. Once a user swipes to one of these portions (e.g., contacts with a finger and drags the finger in a swiping motion), the handheld electronic device 702 can formulate and send an actuation command that can gradually controls the adaptive device (e.g., automated doors) to the position associated with the swiped portion of the swipe region 913. If desired, the user can touch a part of the touch-sensitive display 725 and prolong the touch over time. This type of persistent tapping or touching gesture can result in different remote control behavior for adaptive devices.

In one embodiment, the handheld electronic device 702 can detect a fourth contact associated with a swiping gesture within the swipe region 913, and in response, display one or more control indicia (e.g., the second set of control indicia 911) in the user interface 727 associated with one of the first adaptive device (e.g., wheelchair crane) or the second adaptive device (e.g., automated doors) corresponding to a location within the swipe region 913 where a fourth contact is detected. If the second set of control indicia 911 are associated with an optional adaptive device, these devices can include, for example, transfer seats, a truck bed topper, or remote doors, for example, in addition to the automated doors. This allows the user to navigate through the various controls related to such optional adaptive devices and access these controls without jeopardizing valuable real estate on the touch-sensitive display 724. This also allows future devices to be included without modification to the layout of the screen.

Figure 9C:
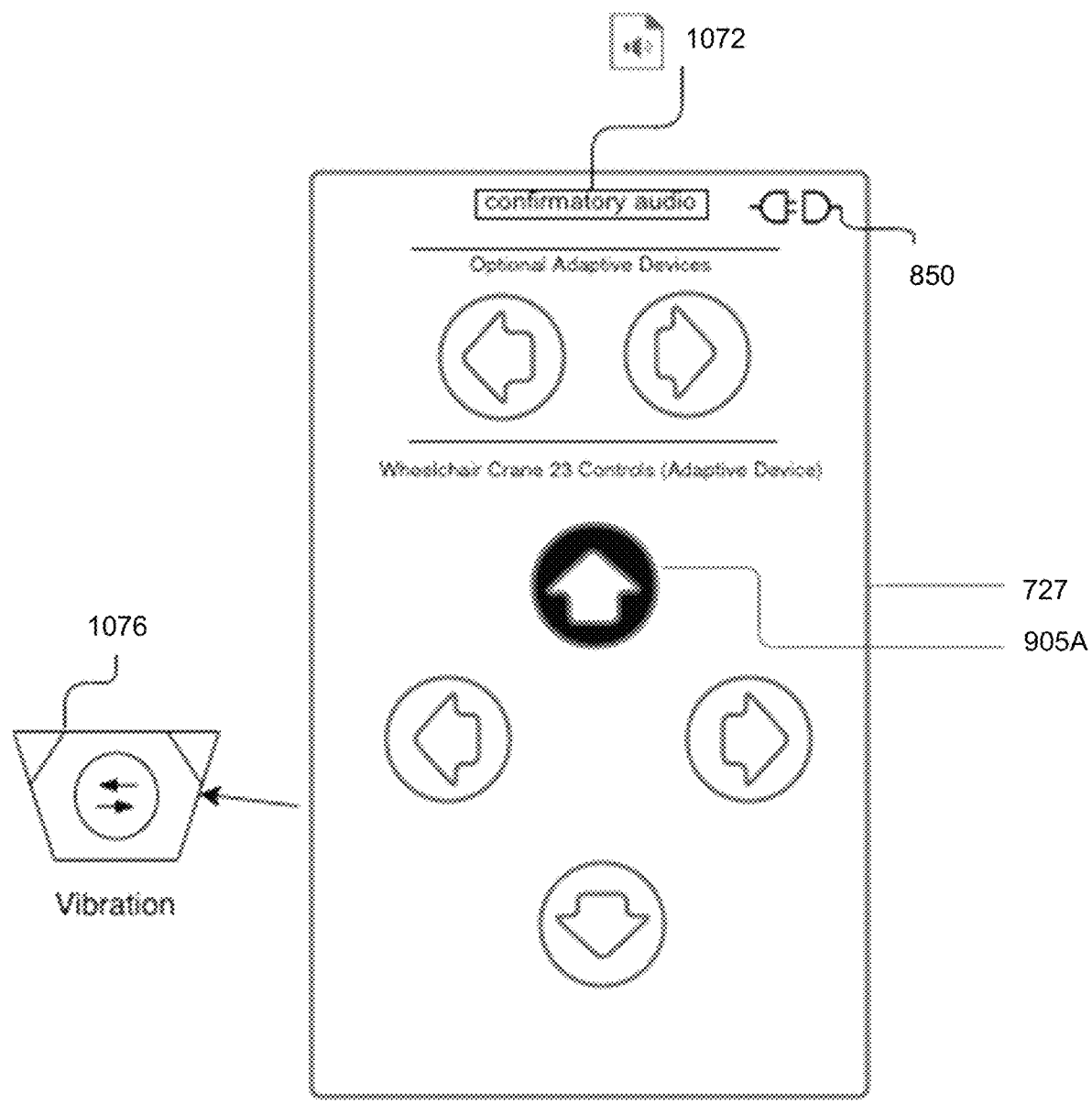
FIG. 9C is the interface diagram of FIG. 9A with additional confirmatory indicia according to at least some embodiments.

FIG. 9C is the interface diagram of FIG. 9A with additional confirmatory indicia according to at least some embodiments. As briefly discussed previously, when a contact (e.g., tap gesture) on the up control indicia 905A, for example, results in a successful upward movement of the wheelchair crane (example of the adaptive device 120), the handheld electric device 702 can generate a confirmatory signal, e.g., in response to receiving a completion signal back from the wireless adapter 110 that the movement was completed.

In various embodiments, this confirmatory signal is a confirmatory audio sound 1072, e.g., coming out of the speaker 772 such as the words "UP," "DOWN," "OPEN," "CLOSE," or the like. The confirmatory signal can also be a confirmatory vibration 1076 generated by the vibrator 776, which can be unique for each separate control indicia that resulted in some kind of successful movement by the adaptive device. For example, the vibration can be pulsed, steady, or a series of pulsed streams of vibrations, each one confirming a different completed movement by the adaptive device. The confirmatory signal can also be a confirmatory visual signal 850, such as a lit icon (e.g., specific icons for certain types of actions), an LED light, certain colors, pulsated colors signals, or the like.

By generating one or more of these confirmatory signals just discussed, the handheld electronic device 702 can ensure that the user is aware that the actuation command(s) completed successfully, despite the user being blind, deaf, or has some other sensory deprivation that makes it difficult to know whether or to what extent the adaptive device has been deployed. Because the wireless adapter 210 employs the Hall effect chip 228, the Hall effect sensor 470, and related technology, even if the user continues hold down a control indicia past an end point, the wireless adapter 210 can still protect from an over-current condition and shut down the adaptive device or at least cause the movement to stop.

FIG. 10 is a flow chart of a method 1000 for selecting and controlling an adaptive device 120 of multiple adaptive devices from a handheld electronic device, according to various embodiments. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by the handheld electronic device 102 and/or 702 (FIG. 1; FIG. 7). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1010, the processing logic displays the user interface 727 on the touch-sensitive display 725, where the user interface 727 includes a set of menu items associated with the adaptive devices.

At operation 1020, the processing logic detects a first contact on the touch-sensitive display associated with a first menu item of the set of menu items, the first menu item for selection of control of a first adaptive device of the plurality of adaptive devices.

At operation 1030, the processing logic, in response to detecting the first contact, displays a set of control indicia associated with control functionality of the first adaptive device.

At operation 1040, the processing logic detects a second contact on the touch-sensitive display 725 associated with a first control indicia of the set of control indicia.

At operation 1050, the processing logic generates an actuation command associated with the first control indicia, the actuation command corresponding to a specific action of the adaptive device.

At operation 1060, the processing logic transmits, via wireless circuitry, the actuation command to a wireless adapter device to which is coupled the adaptive device. In this way, the actuation command is sent in order to remotely control the adaptive device that is wireless coupled to the wireless adapter device. The wireless adapter device can interpret or otherwise translate the actuation command into bits, which can converted to an analog signal and sent over an output harness to ultimately control the adaptive device.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

The above description sets forth numerous specific details such as examples of specific systems, components, methods, and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An adapter device comprising:
   a printed circuit board (PCB);
   an output port disposed on the PCB and having a first plurality of pins, wherein the output port is to be connected to an output harness that is connected to an adaptive device;
   wireless circuitry one of disposed on or coupled to the PCB; and
   a processing device disposed on the PCB and coupled to the output port and the wireless circuitry, wherein the processing device is to:
      identify, via the wireless circuitry, an actuation command from a wireless signal received from a handheld electronic device;
      translate the actuation command to one or more actuation bits that match one of analog-converted bits receivable over an input harness or digital control bits receivable over a wireless controller associated with the adaptive device; and
      provide the actuation bits to one or more of the first plurality of pins, the actuation bits to cause the adaptive device to perform a specific action.

2. The adapter device of claim 1, wherein the adaptive device comprises one of a wheelchair crane, a wheelchair lift, a transfer seat, an automated door, a truck bed topper, a wheelchair elevator, physical therapy equipment, or a gate opener.

3. The adapter device of claim 1, wherein the actuation bits correspond to one or more discrete actions, each discrete action being associated with a bit of the actuation bits and a pin of the plurality of first pins, further comprising a digital-to-analog converter (DAC) coupled between the processing device and the output port, the DAC to convert the actuation bits to an analog signal before being sent over the output harness.

4. The adapter device of claim 1, further comprising the output harness, which comprises:
   an input connector sized to fit within the output port and that has a set of pins that is compatible with the first plurality of pins; and
   an output connector that is sized to fit within an input port of the adaptive device and that has a set of pins that is compatible with a second plurality of pins of the input port.

5. The adapter device of claim 1, further comprising an input port having a second plurality of pins, the input port to receive the input harness, wherein the second plurality of pins are operatively coupled with the first plurality of pins using a predetermined mapping between the input harness of a wired remote control and the output harness.

6. The adapter device of claim 1, further comprising:
a Hall cable connector disposed on the PCB and coupled with the processing device, the Hall cable connector to be connected to a Hall cable that comprises a Hall effect sensor, wherein the Hall cable is to also be connected to a power cable that is connected between a power supply and a motor of the adaptive device; and
wherein the processing device is to:
detect, using the Hall effect sensor, that current supplied to the motor has reached a threshold current value for a predetermined period of time; and
in response to the detection, signal the motor to shut off to protect the motor from an over-current condition.

7. The adapter device of claim 1, further comprising a plurality of output ports that includes the output port, wherein each output port of the plurality of output ports is adapted to connect to one of the output harness or a second output harness that is to connect to another adaptive device that is different than the adaptive device.

8. The adapter device of claim 1, further comprising:
a power supply to provide power to the PCB; and
a reset switch coupled to a power supply, the reset switch being coupled wired or wirelessly, and which when activated, is to disconnect the PCB from and reconnect the PCB to the power supply to reboot the adapter device.

9. The adapter device of claim 1, wherein the wireless circuitry is compatible with at least one of cellular, radio frequency, local area network (LAN), or personal area network (PAN) technology.

10. The adapter device of claim 9, wherein the processing device is further to:
detect, using the PAN technology, that the handheld electronic device is within a predetermined distance of the wireless circuitry;
send a signal to the handheld electronic device to initiate a voice prompt through a speaker of the handheld electronic device that requests whether a user desires that the adaptive device be deployed; and
in response to an affirmative response signal received from of the handheld electronic device, provide at least one of the one or more actuation bits to the first plurality of pins.

* * * * *